United States Patent [19]

Minohara et al.

[11] 4,271,490

[45] Jun. 2, 1981

[54] ULTRASONIC DETECTION SYSTEM

[75] Inventors: Kiyomi Minohara; Akira Sugiyama; Hiroshi Nakai; Masajiro Iida; Hideharu Morimatsu; Yuzo Kobayashi, all of Nishinomiya, Japan

[73] Assignee: Furuno Electric Co., Ltd., Nagasaki, Japan

[21] Appl. No.: 968,710

[22] Filed: Dec. 12, 1978

[30] Foreign Application Priority Data

Dec. 16, 1977 [JP] Japan .................................. 52-152195

[51] Int. Cl.³ .............................................. G01S 3/86
[52] U.S. Cl. ..................................... 367/122; 367/156; 367/905; 367/154
[58] Field of Search ................ 367/105, 122, 123, 156, 367/905, 155, 154

[56] References Cited

U.S. PATENT DOCUMENTS

| 2,703,396 | 3/1955 | Rich | 367/105 |
|---|---|---|---|
| 2,925,581 | 2/1960 | Hackley et al. | 367/905 X |
| 3,210,724 | 10/1965 | Jones et al. | 367/156 |
| 3,618,006 | 11/1971 | Wright | 367/103 |
| 3,851,300 | 11/1974 | Cook | 367/155 |

FOREIGN PATENT DOCUMENTS 395081 7/1933 United Kingdom ..................... 367/905

Primary Examiner—Richard A. Farley
Attorney, Agent, or Firm—Sughrue, Rothwell, Mion, Zinn and Macpeak

[57] ABSTRACT

An ultrasonic detection system having an array of ultrasonic transducers that are uniformly closely disposed relative to each other such that the active surfaces for transmission or reception are maintained on a straight or curved line. The transducers form radiation or reception beams in a specific direction. Beam orientation is accomplished by selecting a group of transducers from the array and/or respectively applying appropriate phase-shifts to the signals to be fed to each of the transducers or to the signals produced from each of the transducers. Shields are maintained between two adjacent transducers for suppression of sidelobes.

17 Claims, 15 Drawing Figures

FIG. 4B
PRIOR ART
FIG. 4A
PRIOR ART
FIG. 5B
FIG. 5A
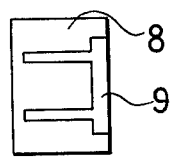
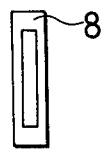
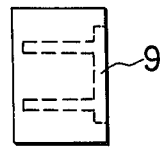
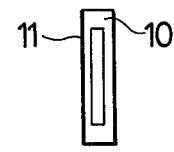
FIG. 6
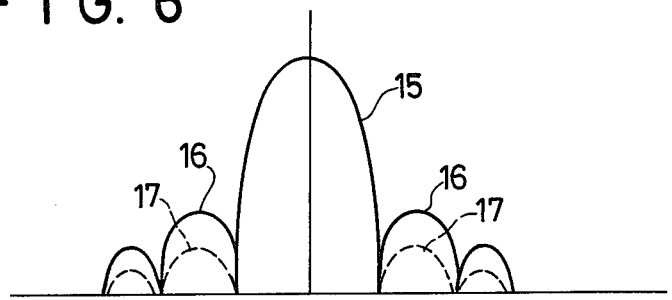
FIG. 7A
FIG. 7B
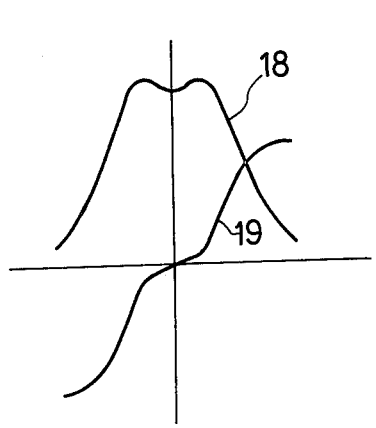
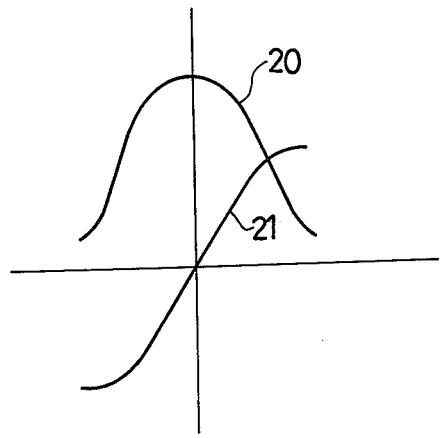

ULTRASONIC DETECTION SYSTEM

BACKGROUND OF THE INVENTION

This invention relates to an ultrasonic detection system having an array of ultrasonic transducers for forming transmission and/or a reception beams by properly choosing a group of transducers and/or respectively applying appropriate phase-shifts to the signals to be fed to each of the transducers or to the signals produced from each of the transducers. More particularly, the invention relates to an ultrasonic detection system which suppresses and maintains sub-beams or sidelobes much smaller with respect to a main transmission or a reception beam compared to prior art systems.

This invention has a particular application in a so-called electronically scanning sonar system which is installed on a ship and used for observing environmental underwater conditions by detecting targets of interest such as schools of fish and the seabed and by displaying the returned signals in the indicator of the system.

As well known, there are various kinds of arrays of ultrasonic transducers available for ultrasonic detection systems. These include, for example: (1) a linear array wherein a plurality of transducers are closely and uniformly disposed at the same spacing intervals in such a manner that the radiation or reception surface of each of the transducers is maintained on a straight line; (2) a non-linear array including a circular one wherein a plurality of transducers are closely and uniformly disposed on a curved line; (3) a planar array wherein a plurality of transducers are closely and uniformly disposed in a plane; (4) a non-planar array wherein a plurality of transducers are closely and uniformly disposed in a curved plane; and (5) a cylindrical array wherein a plurality of transducers are closely and uniformly spaced and arranged in such a way that their radiation or reception surfaces are maintained touching the inside of the periphery of a cylinder.

Hereinafter, this invention will be explained as embodied in an electronically scanning sonar system. The technique for forming a reception beam with a linear array of ultrasonic transducers is, for example, well known. Assuming that all the receiving transducers of an array are simultaneously energized, echo signals are sensed by the transducers coming back from a direction perpendicular to the line of transducers, thus, forming a reception beam in that direction. The reason that a directional reception beam is formed in the perpendicular direction is that the echo signals returned from the direction algebraically add up to re-enforce each other. However, echo signals from other directions are algebraically added to cancel each other.

Also well known is that when, for example, a plurality of receiving transducers of a linear array are simultaneously energized, sidelobes pointing in undesirable directions are inevitably produced on both sides of a main reception beam pointing in a specific searching direction. If these sidelobes are relatively large with respect to a main beam, the echo signals from other undesirable directions as well as from a specific searching direction are received and indicated over the PPI display. Alternatively, false signals are indicated thereover in directions where no targets actually exist. Thus, large sidelobes make it extremely difficult to obtain the signals accurately representing environmental underwater conditions, and, hence, are a significant cause of operator error in distinguishing the signals from desired targets in an indicator.

Accordingly, it is highly desirable that sidelobes should be suppressed to the maximum extent possible and maintained as small as possible with respect to a main beam.

The same kind of problems also arise in transmitting ultrasonic wave energy in a beam form by simultaneously exciting a plurality of transducers of a linear array. If large sidelobes are formed on both sides of a main transmission beam pointing in undesirable directions, the echo signals resulting from transmitted energy come back from undesirable directions as well as a searching direction. This makes it difficult to obtain the signals accurately representing environmental underwater conditions in the reception mode. In addition, large sidelobes cause much radiation energy to be wasted, and, hence, energy management of the overall system is not efficiently maintained.

The same technical problems also arise when any one of the non-linear, circular, planar, non-planar and cylindrical array of ultrasonic transducers is used to form reception or transmission beams.

Magnetostrictive as well as electrostrictive ultrasonic transducers are used to form any kind of array of ultrasonic transducers.

SUMMARY OF THE INVENTION

Accordingly, it is an object of this invention to provide an ultrasonic detection system having an array of ultrasonic transducers which suppresses and maintains sidelobes produced at the lowest level with respect to a main beam.

It is another object of this invention to provide an ultrasonic detection system having an array of magnetostrictive ultrasonic transducers which can maintain sidelobes at an acceptable low level.

Still another object of this invention is to provide an ultrasonic detection system having an array of electrostrictive ultrasonic transducers which can maintain sidelobes under low levels.

A further object of this invention is to provide an electronically scanning sonar system having an array of magnetostrictive ultrasonic transducers which can maintain sidelobes at the acceptable lowest level.

According to one aspect of the present invention, an ultrasonic detection system has an array of ultrasonic transducers uniformly closely disposed in such a way that their radiation or reception surfaces are maintained on a straight or curved line. The transducers form radiation or reception beams in specific directions. This is attained by selecting a group of transducers out of the array of ultrasonic transducers and/or respectively applying appropriate phase-shifts to the signals to be fed to each of the transducers or to the signals produced from each of the transducers. Shields are maintained between two adjacent transducers for suppressing sidelobes to an acceptable level.

Other objects and features of the present invention will be described in more detail herein with reference to accompanying drawings.

BRIEF DESCRIPTION OF THE DRAWINGS

In the drawings:

FIG. 4(A) and FIG. 4(B) are respectively an elevation and a side view of an encapsulated magnetostrictive ultrasonic transducer to be used to form a prior art transducer array assembly as shown in FIG. 3;

FIG. 5(A) and FIG. 5(B) are respectively an elevation and a side view of an encapsulated magnetostrictive ultrasonic transducer to be used to form a transducer array assembly as shown in FIG. 3 being utilized in an electronically scanning sonar system as shown in FIG. 1 according to one embodiment of the present invention;

FIG. 6 is a diagrammatic representation of directive reception responses or beam patterns for use in explaining advantageous effects achieved according to the present invention;

FIG. 7(A) and FIG. 7(B) are diagrammatic representations of directive reception responses and phase characteristic curves obtained respectively with a prior art assembly and with an electronically scanning sonar system according to the present invention;

DESCRIPTION OF THE PREFERRED EMBODIMENT

Figure 1:
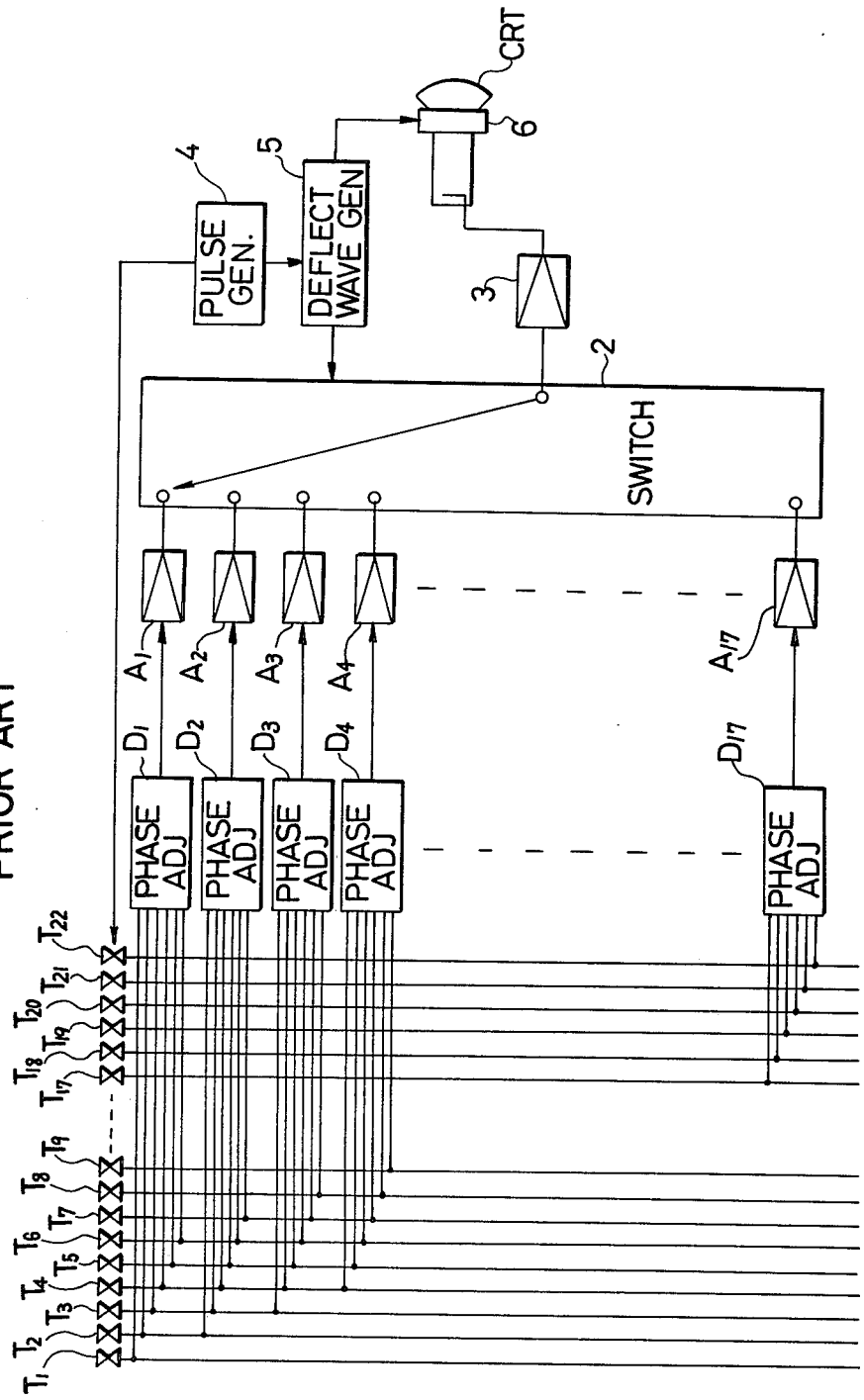
FIG. 1 is a schematic block diagram of a known electronic scanning sonar system applicable to the present invention.

Throughout the drawings, the same reference numerals are given to like components.

Figure 2:
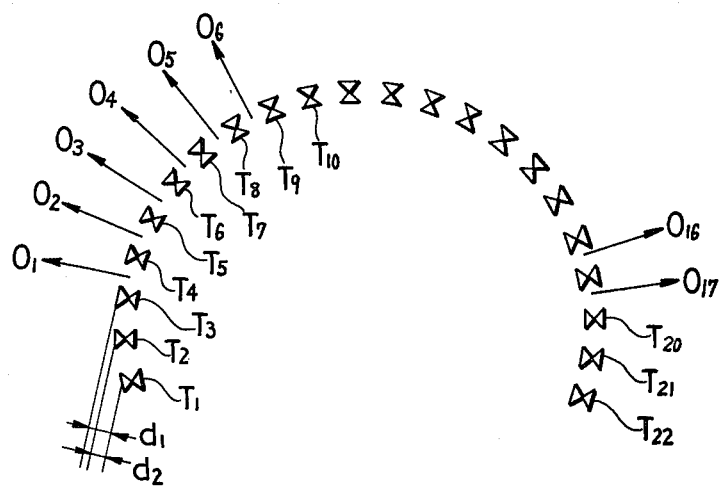
FIG. 2 is a schematic plan view of an arrangement of an array of ultrasonic transducers to be used in the electronic scanning sonar system shown in FIG. 1 and to be used for explaining the reception beam forming operation of the system.
Figure 3A:
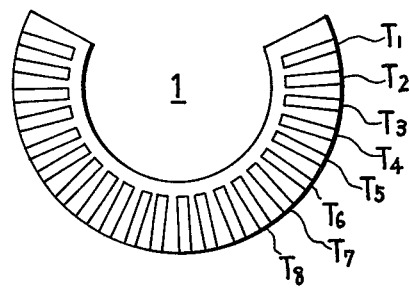
FIG. 3(A) and FIG. 3(B) are respectively a plan and an elevation view of a prior art transducer array assembly used in the electronically scanning sonar system according to one embodiment of the system applicable to the invention as shown in FIG. 1.
Figure 3B:
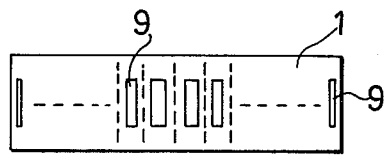

Referring now to FIGS. 1, 2 and 3, an array of transducers 1 (as shown in FIG. 3) may comprise 22 magnetostrictive ultrasonic transducers $T_1, T_2, T_3, \ldots T_{22}$ closely and uniformly arranged along the circumference of an arc, forming substantially half a circle. The transducers $T_1, T_2, T_3, T_4, T_5$ and $T_6$ are respectively connected to the inputs of a phase adjuster $D_1$; the transducers $T_2, T_3, T_4, T_5, T_6$ and $T_7$ are respectively connected to the inputs of a phase adjusted $D_2$; the transducers $T_3, T_4, T_5, T_6, T_7$ and $T_8$ are respectively connected to the inputs of a phase adjuster $D_3$. In the same manner, coupled to the inputs of $D_4, D_5, D_6 \ldots D_{17}$ are respectively ($T_4, T_5, T_6, T_7, T_8$ and $T_9$), ($T_5, T_6, T_7, T_8, T_9$ and $T_{10}$), ($T_6, T_7, T_8, T_9, T_{10}$ and $T_{11}$) ... ($T_{17}, T_{18}, T_{19}, T_{20}, T_{21}$ and $T_{22}$).

The phase adjusters $D_1, D_2 \ldots D_{17}$ are of the same circuit configuration and may be of the type shown in FIG. 2 of U.S. Pat. No. 4,045,766, issued Aug. 30, 1977 and commonly assigned with this application. The description of that circuit found in col. 2, line 47 through col. 3, line 11 is incorporated by reference herein to the extent that a greater understanding of the circuit construction and operation is necessary. Each functions to apply appropriate time delays to the echo signals caught by each of the six transducers to render them in phase, thereby forming a narrow directive reception beam. For instance, the phase adjuster $D_1$ delays in time the echo signals caught by the magnetostrictive ultrasonic transducer $T_3$ by the amount corresponding to the distance $d_1$ (as shown in FIG. 2) between the transducers $T_3$ and $T_1$, and also delays the echo signals received by the transducer $T_4$ by the same amount. It also delays in time the echo signals caught by the transducers $T_2$ and $T_5$ by the amount corresponding to the distance $d_2$ (as shown in FIG. 2) respectively between the transducers $T_2$ and $T_1$, and the transducers $T_5$ and $T_6$.

Consequently, the outputs of the phase adjuster $D_1$ contains only the echo signals coming back from a direction $\theta_1$. Hence, a reception beam is formed in the direction $\theta_1$. In exactly the same manner, the phase adjusters $D_2, D_3, \ldots D_{17}$ form directive reception beams respectively in directions $\theta_2, \theta_3 \ldots \theta_{17}$. The output terminals of the phase adjusters $D_1, D_2, \ldots D_{17}$ are respectively connected to the inputs of amplifiers $A_1, A_2, \ldots A_{17}$. The output terminals of the amplifiers $A_1, A_2, \ldots A_{17}$ are respectively connected to the corresponding input terminals of a switching circuit 2. The switching circuit 2 successively in turn derives the signals appearing at each input terminal thereof and transmits them through an amplifier 3 to the brightness modulation terminal of a cathode ray tube CRT.

A pulse generator 4 periodically produces a short duration pulse of an ultrasonic frequency and simultaneously excites all the transducers $T_1, T_2, \ldots T_{22}$, thereby radiating ultrasonic wave energy in a wide range of directions. The output of the pulse generator 4 is connected to the input of a deflection wave generator 5. One output of the deflection wave generator 5 is connected respectively to one input of the switching circuit 2, and the other outputs are connected to a deflecting means 6 of the cathode ray tube. The deflecting means 6 includes horizontal and vertical deflection plates. The deflection wave generator 5 produces and couples sine and cosine waves the amplitude of which are respectively increased stepwise with every cycle, respectively to the horizontal and vertical deflection plates. This enables an electron beam to scan over the screen of the PPI indicator concentric circles the radius of which are successively stepwise increased.

The cathode ray tube CRT is adapted to brighten a spot when a received signal is applied to the brightness modulation terminal, at a corresponding part over the screen thereof. The deflection wave generator 5 also produces and couples start signals to the switching circuit 2 one for every completion of one circle scanning of the electron beam of the cathode ray tube.

The switching circuit 2 starts switching operation when one of the start signals is fed thereto, and successively derives the output signals of the amplifiers $A_1, A_2, \ldots A_{17}$. Thus, the scanning operation in the PPI indicator is carried out in synchronism with the switching operation of the switching circuit 2 so that return signals from a direction are displayed in the corresponding direction and range over the face of the cathode ray tube. It should be noted that preamplifiers are respectively inserted between the phase adjusters $D_1, D_2, \ldots D_{17}$ and the transducers, although they are not shown in FIG. 1 to make easy observation possible. For instance, the echo signals received by the six transducers $T_1, T_2 \ldots T_6$ are first amplified by pre-amplifiers and then applied to the phase adjuster $D_1$.

In operation, directive reception beams are successively and repetitiously formed, in synchronism with every transmission of searching pulses by the pulse generator 4, respectively in the directions $\theta_1, \theta_2 \ldots \theta_{17}$. The echo signals caused by the radiated energy are captured by these reception beams and displayed over the PPI indicator.

Referring now to FIGS. 3 and 4, the construction of a prior art magnetostrictive transducer array assembly will now be explained. A magnetostrictive transducer 9 having exciting coils wound (not shown) is encapsulated in the form of a rectangular parallelepiped by using foam urethane in such a way that its radiation or reception surface remains uncovered. 22 encapsulated transducers 8 are closely and uniformly disposed around the circumference of an arc substantially forming a semi-circle in a housing (not shown) and are bonded in the housing by using Rho-C rubber. The bonding is accomplished in a manner such that the transducers are fixedly maintained and their surfaces are covered by the Rho-C rubber having the same transmission characteristics as seawater and isolating the transducers from the seawater. In this way, a prior art transducer array assembly as shown in FIG. 3 is constructed.

When this conventional type array assembly is utilized in an electronically scanning sonar system as shown in FIG. 1, and the six transducers $T_1, T_2, T_3, T_4, T_5, T_6$ by way of example are simultaneously energized, reception response curves are obtained as illustrated in solid lines in FIG. 6. In FIG. 6, the horizontal axis represents azimuthal angles and the vertical axis represents relative response. Here, sidelobes 16 appear on both sides of a main reception beam 15, and they are, as illustrated, relatively large with respect to the main beam 15. Such large sidelobes cause disadvantages in the utilization of the system as already discussed.

Referring now to FIGS. 3 and 5, the construction of a magnetostrictive transducer array assembly being utilized in an electronically scanning sonar system according to the present invention will be explained. In the same manner as the prior art device, a magnetostrictive transducer 9 is firstly encapsulated in the form of a rectangular parallelepiped by using foam urethane with its radiation or reception surface uncovered. On one side of the encapsulated transducer 10, a magnetic shielding plate 11 made of permalloy is placed and fixed thereto. Then, the encased transducer 10 with magnetic shielding plates 11 are closely and uniformly placed along the circumference of an arc in the housing, and are bonded therein by using Rho-C rubber in such a way that the transducers 9 and the shielding plates 11 therebetween are fixedly maintained and their radiation or reception surfaces are covered by the Rho-C rubber.

When such a transducer array assembly with magnetic shielding plates (in FIG. 3) is utilized in an electronically scanning sonar system according to the present invention as shown in FIG. 1, and the six transducers $T_1, T_2, T_3, T_4, T_5$ and $T_6$ are simultaneously energized, reception response curves are obtained as illustrated in FIG. 6. Herein, a main reception beam is kept the same as the beam 15 formed by the conventional system but the sidelobes 17 are represented in dotted lines. The reduction in amplitude of the sidelobes is apparent. It has been experimentally confirmed that the peak of the response curves 17 in dotted lines can be kept 3-4 dB down when compared to the peak of the corresponding sidelobe response curves in solid lines for the prior art device.

Thus, according to the present invention, sidelobes can be suppressed to a greater degree with respect to a main beam than the sidelobes obtained in prior art systems. Hence, the scanning sonar system, according to the present invention, can effectively eliminate irrelevant return signals and receives only desired return signals, thus making it possible to have a more accurate indication of environmental underwater conditions.

Further experimental measurements to obtain characteristic curves are shown in FIG. 7. In FIG. 7, the horizontal axis represents azimuthal angles and a vertical axis represents relative response and phase degrees. FIG. 7(A) illustrates a reception response curve 18 and a phase characteristic curve 19 obtained with a transducer incorporated in a conventional transducer array assembly. FIG. 7(B) illustrates a reception response curve 20 and a phase characteristic curve 21 obtained with one transducer having fixed magnetic shielding plates incorporated in the transducer array assembly for use in the sonar system according to the present invention. It has been also confirmed that response and phase characteristic curves as shown in FIG. 7(B) are obtained when one individual magnetostrictive transducer without being incorporated in an array assembly is energized.

The fact that the characteristic curves in FIG. 7(A) are somewhat distorted and those of FIG. 7(B) are smooth without any distortion leads to the conclusion that some mutual interference action exists between two adjacent transducers in a conventional transducer array assembly. Such mutual interference action between two adjacent transducers in the transducer array assembly used in the sonar system according to one embodiment of the invention is eliminated. Generally, reception response curves by way of example such as in FIG. 6, solid lines 15, 16 are obtained by combining a plurality of individual response curves obtained with each of a group of transducers. Therefore, improvement in suppressing sidelobes may be considered to be the result of elimination of mutual interference between adjacent transducers by maintaining magnetic shielding plates therebetween.

Figure 8A:
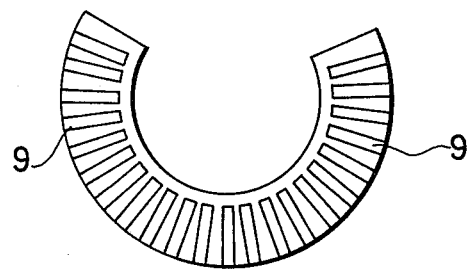
FIG. 8(A) and FIG. 8(B) are respectively plan and an elevation view of another magnetostrictive transducer array assembly to be utilized in an electronically scanning sonar system according to one embodiment of the present invention as shown in FIG. 1.
Figure 8B:
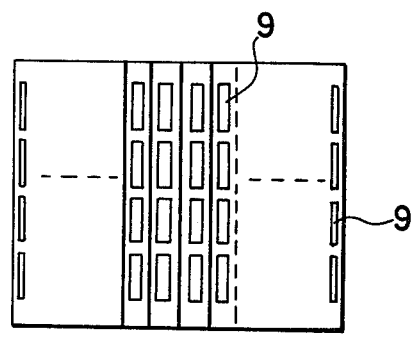
Figure 9B:
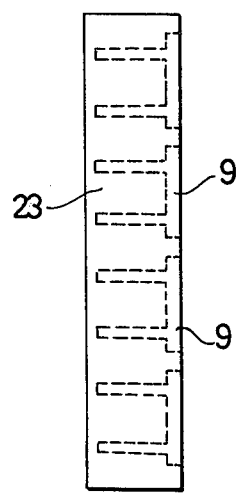
FIG. 9(A) and FIG. 9(B) are respectively an elevation and a side view of an encapsulated magnetostrictive transducer unit with a magnetic shielding plate on its side to be used to form a transducer array assembly as shown in FIG. 8.
Figure 9A:
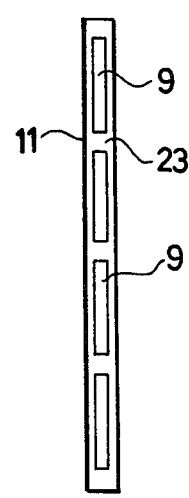

Referring now to FIGS. 8 and 9, the construction of a transducer array assembly used in an electronically scanning sonar system shown in FIG. 1 will be explained. Four magnetostrictive transducers 9 are longitudinally and uniformly arranged on a line and are encapsulated in the form of a rectangular parallelpiped to form a transducer unit 23 by using foam urethane. The transmission or reception surface of each transducer is uncovered. On one side of the encased transducer unit, a magnetic shielding plate made of permalloy is placed and fixed thereto. Exciting coils (not shown) wound on each of the four transducers are series connected, and both ends of the serially connected exciting coils are coupled to corresponding phase adjusters via preamplifiers. Twenty-two encapsulated transducer units 23 with shielding plates 11 are closely and uniformly disposed along the circumference of an arc forming substantially a semi-circle in a housing and bonded therein by using Rho-C rubber in such a way that the transducer units and shielding plates therebetween are fixedly maintained and their radiation or reception surfaces are covered by the Rho-C rubber.

In the case of transducers being aligned in a straight line, phase shifting of the received signal can employ the circuit shown in FIG. 1 of U.S. Pat. No. 4,117,487, entitled "Electronically Scanned Echo Pulse Receiver", commonly assigned with this application. Phase shifting of the transmitted signal can be easily accomplished using delay circuits well known in this art.

Transducer arrays to be utilized in electronically scanning sonar systems according to the present invention are not restricted to the ones as shown in FIGS. 3 and 9. A linear array, a non-linear array including a circular one or a non-planar array including a cylindrical one can be also used.

Shield plates made of permalloy placed between two adjacent magnetostrictive transducers in the transducer array assemblies used in an electronically scanning sonar system according to one embodiment of the present invention can be replaced by other magnetic or conducting shield plates made of ferrite, copper or aluminum. Such shielding materials in granular form can also be used and maintained between any two adjacent transducers.

This invention can also be applied in an ultrasonic transmitting device of ultrasonic detection system. The ultrasonic transmitting device of this invention can suppress side-lobes to a greater degree and hence can efficiently radiate ultrasonic energy and effectively receive the desired echo signals from expected directions. This promotes accurate display of environmental underwater conditions in the indicator. Any kind of transducer arrays can also be utilized in transmitting devices.

The magnetostrictive transducer array utilized in an electronically scanning sonar system according to one embodiment of this invention shown in FIG. 1 can be replaced by electrostrictive transducer array of any kind. Relatively large sidelobes produced in forming a radiation or a reception beam pattern may be considered to be the result of electrostatic mutual interference between any two adjacent electrostrictive transducers of a transducer array. The improvement in suppressing sidelobes to a lower level is made by inserting electrostatic shields composed of conducting materials such as copper or aluminum between any two adjacent transducers. It is known that magnetic shields composed of by way of example permalloy and ferrite also serve as electrostatic shields.

In the embodiments afore-explained, shields are placed only on both sides of an ultrasonic transducer, but shields can also be placed on upper and lower sides of a transducer or can be arranged to enclose it.

The preferred embodiment of this invention is not restricted to an electronically scanning sonar system, but this invention may also be applied to ultrasonic detection systems of any kinds used in forming a radiation and/or a reception beam by properly choosing a group of transducers and/or respectively applying appropriate phase shifts to the signals to be fed to each of the transducers or to the signals produced from each of the transducers.

While the invention has been described in detail and with reference to specific embodiments thereof, it will be apparent to one skilled in the art that various changes and modifications can be made therein without departing from the spirit and scope thereof.

We claim:

1. In an ultrasonic detection system having a plurality of ultrasonic transducers uniformly closely disposed such that their active surfaces are maintained fixed relative to each other for forming beams in specific directions by selecting a group of ultrasonic transducers and respectively applying appropriate phase-shifts to the signals to be fed to each of the ultrasonic transducers, the improvement comprising a magnetic or electrically conductive shield between any two adjacent transducers for suppressing sidelobes in said beam pattern.

2. An ultrasonic detection system as defined in claim 1, wherein a plurality of ultrasonic transducers are closely and uniformly disposed along the circumference of a circle or an arc in such a way that their active surfaces are maintained touching the inside of the circumference thereof.

3. The system of claim 2, wherein said active surfaces are used for transmission and reception of a radiation signal.

4. An ultrasonic detection system as defined in claim 1, wherein a plurality of ultrasonic transducers are closely and uniformly disposed along the periphery of at least a portion of a cylinder in such a way that their active surfaces are maintained touching on the inside of the periphery thereof.

5. The system of claim 4, wherein said active surfaces are used for transmission and reception of a radiation signal.

6. An ultrasonic detection system as defined in claim 1, wherein a plurality of ultrasonic transducers are closely and uniformly disposed and output terminals of each of a group of ultrasonic transducers of said plurality of ultrasonic transducers coupled to corresponding input terminals of phase adjusting means for applying an appropriate time delay to the signals produced from said each ultrasonic transducer whereby a reception beam is formed in a specific direction.

7. An ultrasonic detection system as defined in claim 1, wherein a plurality of ultrasonic transducers are closely and uniformly disposed and input terminals of each of a group of ultrasonic transducers of said plurality of ultrasonic transducers coupled to corresponding output terminals of phase adjusting means for applying an appropriate time delay to the signals to be fed to said each ultrasonic transducer whereby a transmission beam is formed in a specific direction.

8. An ultrasonic detection system as defined in claim 1, wherein a plurality of ultrasonic transducer units are closely and uniformly disposed to form a cylindrical transducer array, and output terminals of each of a group of ultrasonic transducer units of said plurality of ultrasonic transducer units coupled to corresponding input terminals of phase adjusting means for applying an appropriate time delay to the signals produced from said each ultrasonic transducer unit whereby a reception beam is formed in a specific direction.

9. An ultrasonic detection system as defined in claim 8 further comprising an ultrasonic transducer unit having a plurality of ultrasonic transducers closely, uniformly and longitudinally arranged in a straight line.

10. An ultrasonic detection system as defined in claim 1, wherein a plurality of ultrasonic transducer units are closely and uniformly disposed to form a cylindrical transducer array, and input terminals of each of a group of ultrasonic transducer units of said plurality of ultrasonic transducer units coupled to corresponding output terminals of phase adjusting means for applying an appropriate time delay to the signals to be fed to said each ultrasonic transducer whereby a transmission beam is formed in a specific direction.

11. An ultrasonic detection system as defined in claim 10 further comprising an ultrasonic transducer unit having a plurality of ultrasonic transducers closely, uniformly and longitudinally arranged in a straight line.

12. An ultrasonic detection system as defined in claim 1, wherein a plurality of ultrasonic transducers are closely and uniformly disposed on a straight line at uniform spacing intervals, the output terminals of each of said plurality of ultrasonic transducers coupled to corresponding input terminals of phase shifting means for applying an appropriate phase-shift to the signals produced from said each ultrasonic transducer whereby the signals from each of the transducers are successively uniformly phase-shifted relative to the preceding signal.

13. An ultrasonic detection system as defined in claim 1, wherein a plurality of ultrasonic transducers are closely and uniformly disposed on a straight line at a uniform spacing interval, the input terminals of each of said plurality of ultrasonic transducers coupled to corresponding output terminals of phase-shifting means for applying an appropriate phase-shift to signals to be fed to each of said ultrasonic transducers whereby the signals to be fed to each of the ultrasonic transducers are uniformly successively phase-shifted relative to the preceding signal.

14. An ultrasonic detection system as defined in claims 1, 2, 3, 4, 5, 6, 7, 8, 9, 10, 11, 12 or 13, wherein magnetostrictive ultrasonic transducers are employed as said ultrasonic transducers and said shields are maintained between two adjacent magnetostrictive ultrasonic transducers.

15. An ultrasonic detection system as defined in claims 1, 2, 3, 4, 5, 6, 7, 8, 9, 10, 11, 12 or 13, wherein electrostrictive ultrasonic transducers are employed and conducting shields are maintained between two adjacent electrostrictive ultrasonic transducers.

16. An ultrasonic detection system as claimed in claim 14 wherein said shields are materials in granular form.

17. An ultrasonic detection system as claimed in claims 1, 2, 3, 4, 5, 6, 7, 8, 9, 10, 11, 12 or 13, wherein said shields are placed on both sides of and above and below said transducers thereby surrounding each said transducer.

* * * * *